(12) United States Patent
Mehas et al.

(10) Patent No.: US 10,637,356 B2
(45) Date of Patent: Apr. 28, 2020

(54) MULTIPLE-LEVEL BUCK BOOST CONVERTER CONTROL

(71) Applicant: Integrated Device Technology, Inc., San Jose, CA (US)

(72) Inventors: Gustavo Mehas, Mercer Island, WA (US); Rui Liu, Fremont, CA (US); Lijie Zhao, San Jose, CA (US); Siqiang Fan, Foothill Ranch, CA (US); Tae Kwang Park, San Jose, CA (US); Zhitong Guo, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 15/944,513

(22) Filed: Apr. 3, 2018

(65) Prior Publication Data

US 2018/0287497 A1    Oct. 4, 2018

Related U.S. Application Data

(60) Provisional application No. 62/484,830, filed on Apr. 12, 2017, provisional application No. 62/480,959, filed on Apr. 3, 2017.

(51) Int. Cl.
| | |
|---|---|
| *H02M 3/158* | (2006.01) |
| *G05F 1/10* | (2006.01) |
| *H02M 1/00* | (2006.01) |
| *H02M 1/32* | (2007.01) |

(52) U.S. Cl.
CPC ............ *H02M 3/1582* (2013.01); *G05F 1/10* (2013.01); *H02M 3/1584* (2013.01); *H02M 3/1588* (2013.01); *H02M 1/32* (2013.01); *H02M 2001/0025* (2013.01)

(58) Field of Classification Search
CPC .. H02M 3/156; H02M 3/1582; H02M 3/1584; H02M 3/1588
USPC .......................... 323/242, 259, 288, 326, 344
See application file for complete search history.

(56) References Cited

U.S. PATENT DOCUMENTS

| | | | | |
|---|---|---|---|---|
| 8,860,384 | B2 * | 10/2014 | Chen ................... | H02M 3/1582 323/222 |
| 9,093,901 | B2 * | 7/2015 | Xu ....................... | H02M 3/1582 |
| 2007/0210782 | A1 * | 9/2007 | Prexl ................... | H02M 3/1582 323/288 |
| 2009/0108823 | A1 * | 4/2009 | Ho ....................... | H02M 3/1582 323/282 |
| 2010/0231272 | A1 * | 9/2010 | Chen ................... | H02M 3/1582 327/140 |

(Continued)

*Primary Examiner* — Alex Torres-Rivera
(74) *Attorney, Agent, or Firm* — Haynes and Boone, LLP

(57) ABSTRACT

A power converter control circuit includes a first ramp generator connected to an input voltage and configured to produce a first ramp signal; a second ramp generator connected to the input voltage and configured to produce a second ramp signal; an error amplifier configured to produce an error amplifier output. The first ramp signal and the error amplifier output are used to produce a first (pulse width modulation) PWM signal and the second ramp signal and the error amplifier output are used to produce a second PWM signal. The first and second PWM signals control an operating state of the circuit. In some embodiments, the first ramp signal includes an extended ramp reset time. In some embodiments, the first ramp generator includes a switching device, a current source, and a capacitor.

16 Claims, 5 Drawing Sheets

(56) References Cited

U.S. PATENT DOCUMENTS

| | | | |
|---|---|---|---|
| 2011/0156685 A1* | 6/2011 | Chen | H02M 3/1582 323/284 |
| 2013/0241660 A1* | 9/2013 | Midya | H03F 1/0227 330/297 |
| 2014/0266117 A1* | 9/2014 | Goncalves | H02M 3/158 323/283 |
| 2014/0333278 A1* | 11/2014 | Chang | H02M 3/156 323/288 |
| 2017/0279359 A1* | 9/2017 | Goncalves | G05F 1/10 |

* cited by examiner

MULTIPLE-LEVEL BUCK BOOST CONVERTER CONTROL

RELATED APPLICATIONS

The present disclosure claims priority to U.S. Provisional Application 62/480,959, filed on Apr. 3, 2017, and U.S. Provisional Application 62/484,830, filed on Apr. 12, 2017, each of which is incorporated by reference in their entirety.

FIELD

The present disclosure relates generally to converter control technologies and more particularly to providing multiple levels of buck boost converter control.

BACKGROUND

A buck-boost converter is a DC-to-DC converter having an output voltage magnitude that is either greater than or less than the input voltage magnitude. A buck-boost converter may have several different power transfer states, for example, a charging state and a discharging state. In a charging state, an input voltage source provides power through an inductor, resulting in power being delivered to an output load—including an energy storage devices such as a battery; in a discharging state, energy is discharged from the energy storage device through the inductor to provide power to devices formally powered by input voltage, resulting in an energy discharge.

Technologies for controlling and maintaining different power states in a buck boost converter, as well as those for providing smooth transitions from one power state to another are needed to improve converter efficiency and performance.

SUMMARY

A power converter control circuit includes a first ramp generator connected to an input voltage and configured to produce a first ramp signal; a second ramp generator connected to the input voltage and configured to produce a second ramp signal; an error amplifier configured to produce an error amplifier output. The first ramp signal and the error amplifier output are used to produce a first (pulse width modulation) PWM signal and the second ramp signal and the error amplifier output are used to produce a second PWM signal. The first and second PWM signals control an operating state of the circuit. In some embodiments, the first ramp signal includes an extended ramp reset time. In some embodiments, the first ramp generator includes a switching device, a current source, and a capacitor.

DETAILED DESCRIPTION

Figure 1:
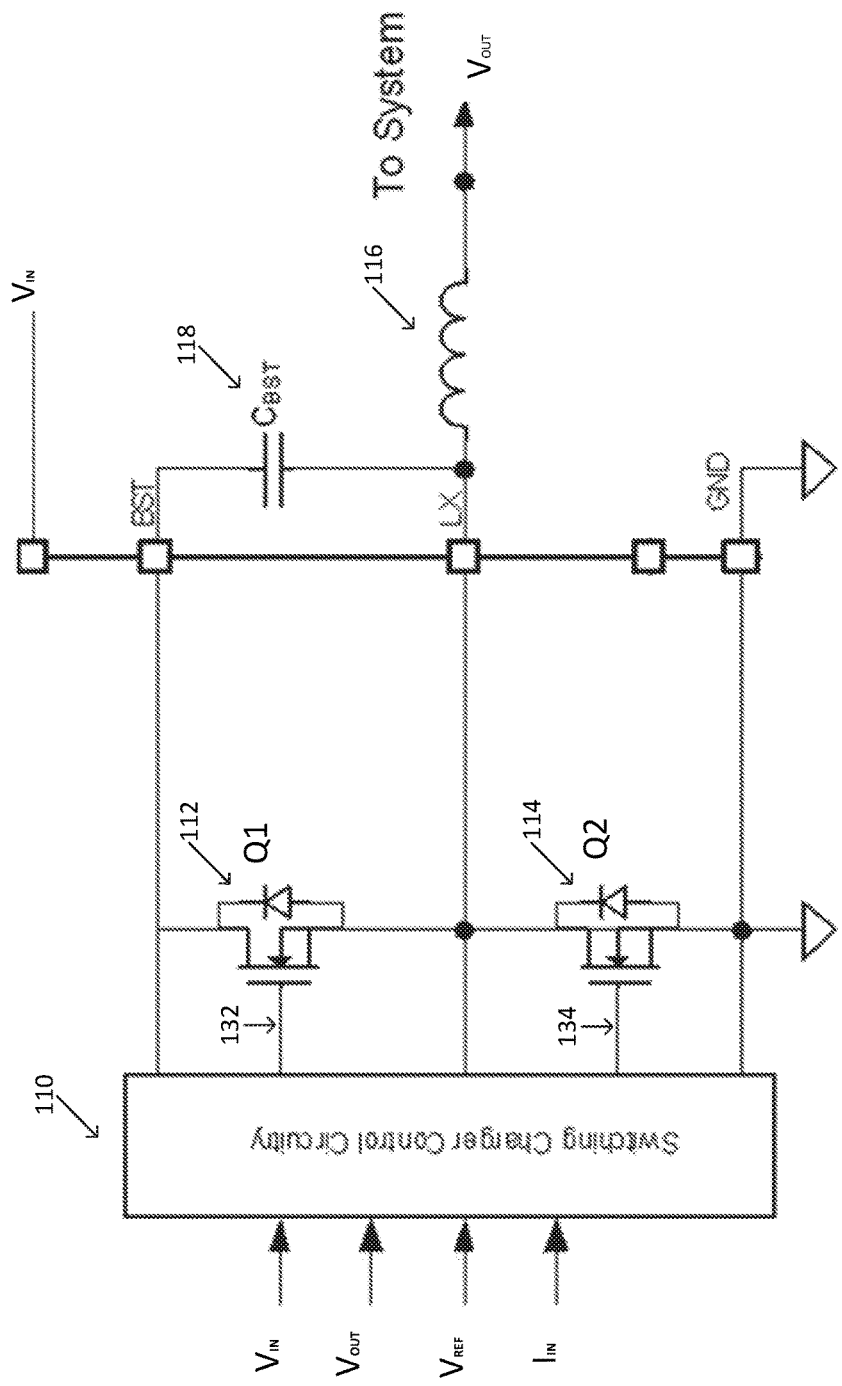
FIG. 1 is a simplified diagram of a charging system according to some embodiments.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions. In addition, to avoid unnecessary repetition, one or more features shown and described in association with one embodiment may be incorporated into other embodiments unless specifically described otherwise or if the one or more features would make an embodiment non-functional.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, controller, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

FIG. 1 is a simplified diagram of a charging system 100 according to some embodiments. Charging system 100 includes a switching charging control circuit 110 coupled to transistors 112 (Q1), and 114 (Q2). Transistors 112 (Q1), and 114 (Q2), with inductor 116, form a buck regulator that functions as a switching charger. A capacitor 118 is coupled between inductor 116 and an input voltage. Pulse-Width Modulation (PWM) signals may be used to drive transistors 112 (Q1), and 114 (Q2).

Switching charging control circuit 110 may include the following inputs, $V_{IN}$, $V_{OUT}$, $V_{REF}$, and $I_{IN}$. $V_{IN}$ represents an input voltage to switching charging control circuit 110; $V_{OUT}$ represents an output voltage provided by inductor 116 to a load; $V_{REF}$ represents a reference voltage which $V_{OUT}$ is compared against in order to generate an error signal which is used by control circuit 110 to regulate $V_{OUT}$ to a target value.

System 100 presents multiple challenges to operation. First, control logic provided by switching charging control circuit 110 based on PWM signals 132 and 134 may not provide sufficient buck boost control for producing multiple (e.g., two, three, or four) power transfer states. Second, the control logic produced based on PWM signals 132 and 134 may also produce dead zones e.g., abrupt (as opposed to smooth) transitions between different power transfer states. Third, the control logic produced based on PWM signals 132 and 134 may result in significant increases to the voltage levels of transistors 112 and 114 and therefore cause transistors 112 and 114 to suffer from drain-source voltage ($V_{DS}$) over-stress. Furthermore, it would be desirable to implement relevant control technologies that can provide synchronous buck and boost in silicon materials. Embodiments of the buck boost converter control technologies described in the present disclosure are able to provide one or more of these advantages.

Figure 2:
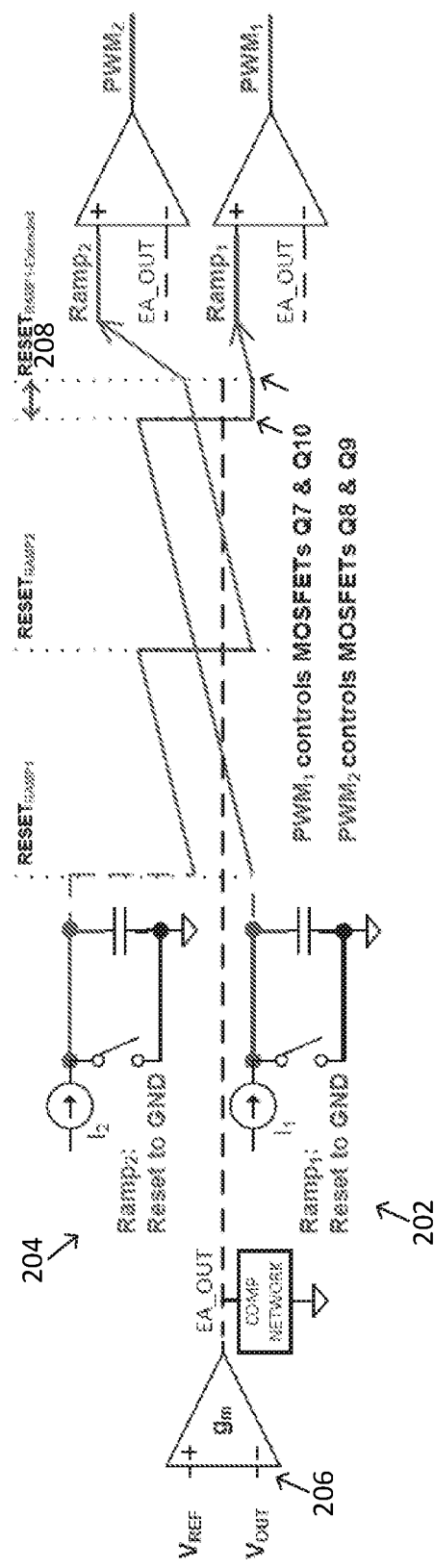
FIG. 2 is a simplified diagram of a multi-level buck converter control system according to some embodiments.

FIG. 2 is a simplified diagram of a multi-level buck boost converter control system 200 according to some embodiments. According to some embodiments, the system 200 addresses one or more of the problems identified in the present disclosure. As shown in FIG. 2, the system 200 includes two ramp generator circuits 202 and 204 (which are also referred to as ramp generators in the present disclosure). System 200 also includes an error amplifier 206, the inputs of which include $V_{REF}$ and $V_{OUT}$ and the output of which is EA_OUT.

The combination of the outputs from ramp generators 202 and 204 and the outputs from error amplifier 206 can create four power transfer states for a buck-boost converter, such as the buck-boost converter of FIG. 3 as described further below. One of the power transfer states corresponds to when the voltage of error amplifier 206 is less than the voltage of both ramp generator 202 and 204, where Lx is coupled to GND (as shown in FIG. 3).

Figure 3:
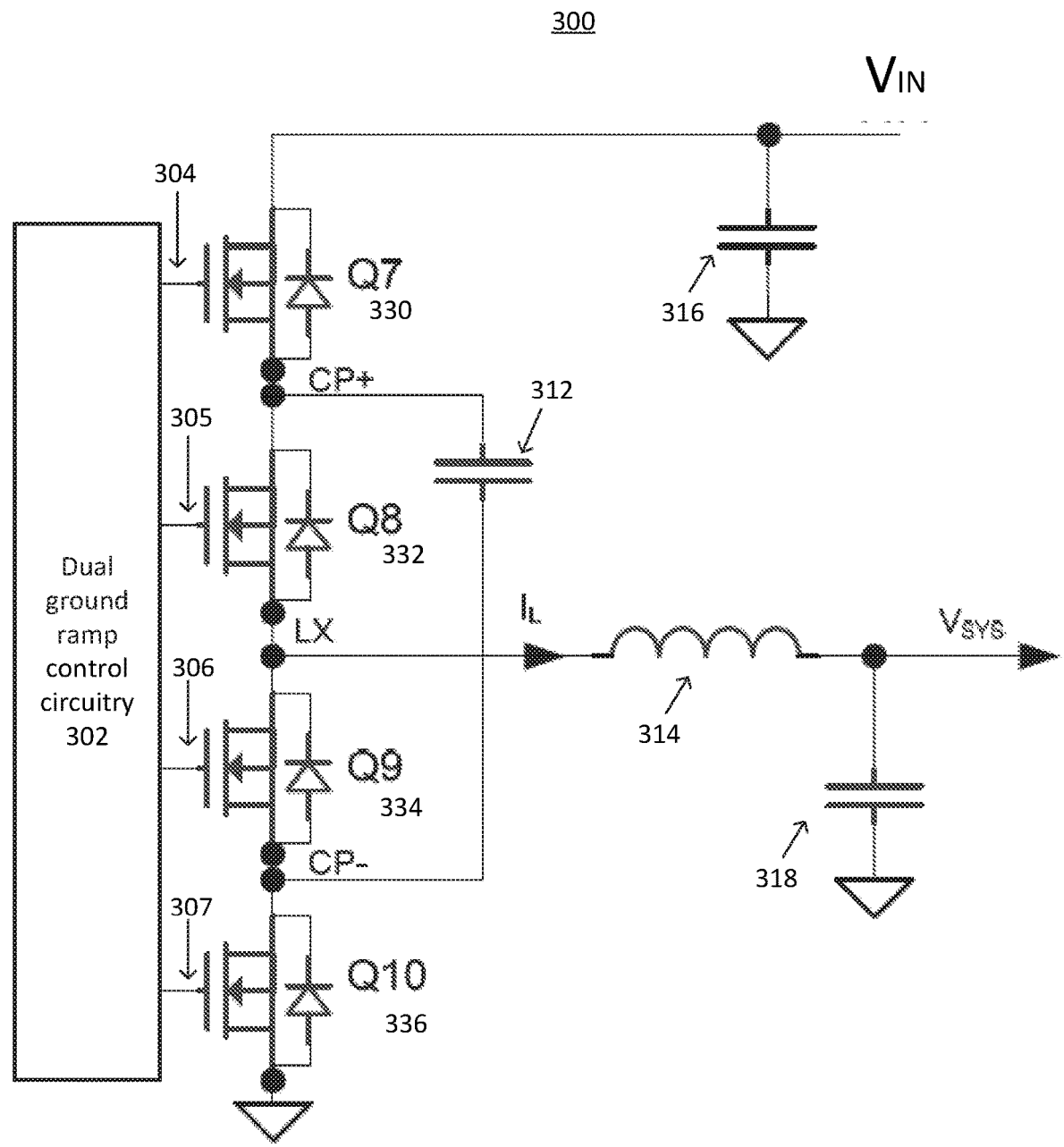
FIG. 3 is a simplified diagram of a driver circuit for providing multiple levels of control on a buck boost converter according to some embodiments.

Another power transfer state corresponds to when the voltage of error amplifier 206 is greater than the voltage of ramp generator 202, but less than the voltage of ramp generator 204, where Lx is coupled to $V_{IN}$ (as shown in FIG. 3) via a flying capacitor, e.g., the flying capacitor 312 shown in FIG. 3.

Another power transfer states corresponds to when the voltage of error amplifier 206 is greater than the output of the ramp generator 204, but less than the output of ramp generator 202, where Lx is coupled to GND via flying capacitor 312.

Another power transfer states corresponds to when the voltage of error amplifier 206 is greater than both the voltage of ramp generator 204 and the voltage of ramp generator 202, where Lx is coupled to $V_{IN}$ (as shown in FIG. 3).

Ramp generator 202 may include a first current source $I_1$ a first switch, and a first capacitor connected to the ground. Ramp generator 204 may include a second current source $I_2$, a second switch, a second capacitor connected to the ground. In some example embodiments, the current sources of ramp generators 202 and 204 may be switched in order to produce different PWM signals. Based on the on/off status of the switch included in a ramp generator, the capacitor of the ramp generator may begin charging or discharging, generating different ramp signals, which can be used to generate the PWMs used to control the transistors shows in FIG. 3. Other ramp generator circuits may also be used to produce ramp signals.

The output of a ramp generator and the output of an error amplifier can be used to produce PWM signals which may be provided as inputs to two or more of the switching devices used to implement the power transfer states of the multi-level buck boost converter. As shown in FIG. 3, in some examples, $PWM_1$, which is produced based on the output of ramp generator 202 and the output of error amplifier 206 (i.e., EA_OUT), is used to control (Q7 and Q10, respectively). In some examples, $PWM_2$, which is produced based on the output of ramp generator 204 and the output of error amplifier 206, is used to control transistors 332 and 336 (Q8 and Q9, respectively).

According to some embodiments, the ramp reset time for a ramp generator may alternatively be extended (or prolonged). In some examples, as shown in FIG. 2, the reset time 208 of ramp generator 202 is extended to produce an extended reset time 208 before ramp generation resumes. As explained in more detail with respect to FIG. 5, an extended ramp reset time can be used to control the average amount of charge being held by the flying capacitor, thereby controlling the voltage of the flying capacitor.

FIG. 3 is a simplified diagram of a driver circuit 300 for providing multiple levels of control on a buck boost converter according to some embodiments.

The circuit 300 may include a dual ramp control circuitry 302, four switching devices 330, 332, 334, and 336 (Q7, Q8, Q9, and Q10, respectively), a capacitor 312, and an inductor 314. The dual ground ramp control circuitry 302 may include multi-level buck boost converter control system 200 shown in FIG. 2. As shown in FIG. 3, the switching devices may include transistors and N-channel MOSFETs, but other switching devices may be used in other embodiments.

As shown in FIG. 3, dual ground ramp control circuitry 302 outputs four PWM signals, PWM 304, PWM 305, PWM 306, and PWM 307, to the transistors included in the driver circuit 300. As shown in FIG. 3, PWM 304 is provided to the gate of transistors 330 (Q7); PWM 305 is provided to the gate of transistors 332 (Q8); PWM 306 is provided to the gate of transistors 334 (Q9); and PWM 307 is provided to the gate of transistors 336 (Q10). In some examples, PWM 307 is an inversion of PWM 304 and PWM 306 is an inversion of PWM 305. In some embodiments, PWM 304 is consistent with PWM$_1$ of FIG. 2 and PWM 305 is consistent with PWM$_2$ of FIG. 2.

The source of transistor 330 (Q7) is connected to a first lead (CP+) of capacitor 312; the drain of transistor 330 (Q7) is connected to the input voltage of the driver circuit 300, V$_{IN}$, and a first lead of capacitor 316. The source of transistor 332 (Q8) is connected to an Lx terminal of the driver circuit 300; the drain of transistor 332 (Q8) is connected to the first lead (CP+) of capacitor 312. The source of transistor 334 (Q9) is connected to a second lead (CP−) of capacitor 312; the drain of transistor 334 (Q9) is connected to the Lx terminal of the driver circuit 300. The source of transistor 336 (Q10) is connected to the ground; and the drain of transistor 336 (Q10) is connected to the second lead (CP−) of capacitor 312.

The first lead of inductor 314 is connected to the Lx terminal and the second lead of inductor 314 is connected to a first lead of capacitor 318 and the system or output voltage, V$_{sys}$.

The first lead of capacitor 316 is connected to the drain of transistor 334 (Q7); the second lead of capacitor 316 is connected to the input voltage of the driver circuit 300, V$_{IN}$. The first lead of capacitor 318 is connected to the second lead of inductor 314 and the system voltage, V$_{sys}$, and the second lead of capacitor 318 is connected to the ground. Gates of transistors 330 (Q7), 332 (Q8), 334 (Q9), and 336 (Q10) are connected to the outputs of dual ground ramp control circuitry 302.

Capacitor 312 (C$_{FLY}$) included in the circuit 300 may also be referred to as flying capacitor 312 in the present disclosure. As shown in FIG. 3, the flying capacitor 312 may be provided across the pair of transistors 332 (Q8) and 334 (Q9). The flying capacitor 312 can reduce the average voltage across inductor 314. Reducing the average voltage across inductor 314 and flying capacitor 312 may help also reduce the voltage difference between the drain and the source (V$_{DS}$) of a transistor connected to inductor 314 and flying capacitor 312, reducing or eliminating the likelihood that a MOSFET transistor becomes electronically over-stressed.

In some examples, the dual ground ramp control circuitry 302 may include two ground ramp generators and an error amplifier. The output of one of the ground ramp generators and the output of the error amplifier may be used to generate a first PWM signal to control Q7 and Q10; and the output of the other ground ramp generator and the output of the error amplifier may be used to generate a second PWM signal to control Q8 and Q9. The use of the first PWM and the second PWM can create at least the following four power transfer states in the circuit 300:

Lx coupled to GND (power transfer state #1, also referred to as a reset low state);

Lx coupled via flying capacitor 312 to V$_{IN}$ (power transfer state #2), also referred to as a charging state;

Lx coupled via flying capacitor 312 to GND (power transfer state #3), also referred to as a discharging state; and Lx coupled to V$_{IN}$ (power transfer state #4, also referred to as a reset high state).

According to Ohm's Law and the inductor equation, V$_L$ equals to L*di/dt, where V$_L$ represents the instantaneous voltage across an inductor; L represents inductance (in Henrys); and di/dt represents instantaneous rate of current changes (in amps per second). Therefore, the voltage across the inductor 314 in each of the above-identified power transfer states can be calculated as follows:

when Lx is coupled to GND, V$_L$ equals to 0V−V$_{OUT}$;

when Lx is coupled via flying capacitor 312 to, V$_{IN}$, V$_L$ equals to V$_{IN}$−V$_{CFLY}$−V$_{OUT}$;

when Lx is coupled to GND via flying capacitor 312, V$_L$ equals to 0V+V$_{CFLY}$−V$_{OUT}$; and when Lx coupled to V$_{IN}$, V$_L$ equals to V$_{IN}$−V$_{OUT}$.

Implemented using these circuit design technologies, the circuit 300 can provide smooth transitions between different power transfer states. In some examples the circuit 300 can also prevent MOSFET transistors from suffering from electrical over-stress, and select a correct system/circuit operating mode even when multiple stable modes exist for a given error amplifier voltage. These technologies can further enable the implementation of a synchronous buck and boost feature in driver circuit 300.

Figure 4:
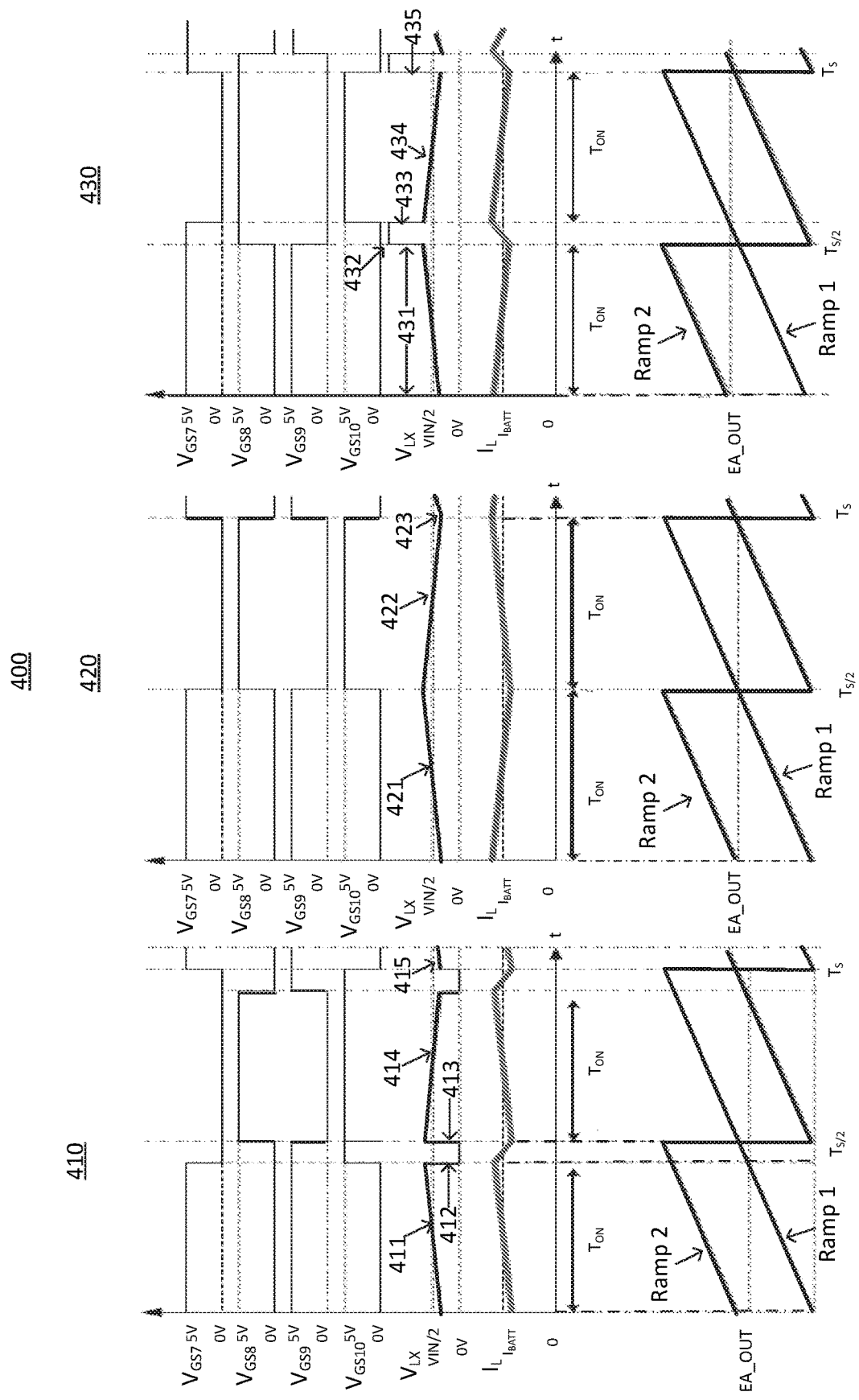
FIG. 4 are simplified timing diagrams 400 for illustrating control of a buck boost converter at multiple feedback levels according to some embodiments.

FIG. 4 illustrates simplified timing diagrams 400 for control of a buck boost converter at multiple feedback levels according to some embodiments. Different EA_OUT levels may cause the buck boost converter to operate in different combinations of the power transfer states. Diagrams 410-430 demonstrate different buck boost converter behaviors for different EA_OUT levels. And, although the EA_OUT levels are shown at a constant value, it should be understood that the EA_OUT level is often changing as changing load conditions place different demands on the buck boost converter. EA_OUT level may also change based on changes to I$_{OUT}$, V$_{IN}$, and V$_{OUT}$.

The signals V$_{GS7}$, V$_{GS8}$, V$_{GS9}$, and V$_{GS10}$, as shown in FIG. 4, represent the voltage levels used to, respectively, drive the gates of transistors 330-336 (Q7-Q10) shown in FIG. 3. V$_{Lx}$ represents the voltage level at the Lx terminal; and I$_L$ represents the current flowing out of the Lx terminal of driver circuit 300 and into the first lead of inductor 314.

Diagram 410 shows the transition between different power transfer states. During time interval 411 (also referred to as the first T$_{ON}$ time period), output of the error amplifier (EA_OUT) is greater than level of ramp 1, but less than level of ramp 2; as a result, the buck boost converter is in the second power transfer state, in which Lx is coupled to V$_{IN}$ via the C$_{FLY}$ and V$_L$ can be determined based on V$_{IN}$−V$_{CFLY}$−V$_{OUT}$.

As shown in timing diagram 410, during the first T$_{ON}$ time period, gate voltages at transistor 330 (Q7) and transistor 334 (Q9) are driven to 5V so that transistors 330 and 334 shown in FIG. 3 are turned on (operated in saturation) and gate voltages at transistor 332 (Q8) and 336 (Q10) shown in FIG. 3 are driven to 0V so that transistors 332 and 336 are turned off (operated in cutoff). During the first T$_{ON}$ time period, therefore, V$_{Lx}$ increases and the current I$_L$ increases as well.

At the end of the first T$_{ON}$ and at a time 412, the level of ramp 1 begins to exceed EA_OUT and the buck boost converter is switched to the first power transfer state and the gate voltage on transistor 330 (Q7) is driven to 0V so that transistor 330 is turned off (operated in cutoff); and the gate voltage on transistor 336 (Q10) is driven to 5V so that transistor 336 is turned on (operated in saturation). The gate voltages at transistors 332 (Q8) and 334 (Q9) remain 0V and 5V, respectively, so that transistors 332 and 334 are kept off and on, respectively. Therefore, at the end of the first T$_{ON}$ and beginning at time 412, Lx is coupled to GND.

At time 413, ramp 2 is reset and EA_OUT is greater than level of ramp 2, but less than level of ramp 1. As a result, the buck boost converter is switched to the third power transfer state. The gate voltage on transistor 332 (Q8) is driven to 5V so that transistor 332 is turned on (operated in saturation); the gate voltage on transistor 334 (Q9) is driven to 0V so that transistor 334 is turned off (operated in cutoff). The gate voltage at transistors 330 (Q7) and 336 (Q10) remain 0V and 5V, respectively, so that transistors 330 and 336 are kept off and on, respectively. Beginning at time 413, therefore, Lx is coupled to GND via $C_{FLY}$.

During time interval 414, EA_OUT is greater than level of ramp 2, but less than the level of ramp 1, as a result, the buck boost converter is in the third power transfer state. The gate voltage on transistor 332 (Q8) is driven to 5V so that transistor 332 is turned on (operated in saturation); the gate voltage on transistor 334 (Q9) is driven to 0V so that transistor 334 is turned off (operated in cutoff). The gate voltages at transistors 330 (Q7) and 336 (Q10) remain 0V and 5V, respectively, so that transistors 330 and 336 are kept off and on, respectively. Beginning at time 413, therefore, Lx is coupled to GND via $C_{FLY}$.

Between time interval 414 and time interval 415, EA_OUT is less than the levels of both ramp 1 and ramp 2; as a result, the buck boost converter is in the first power transfer state. Between time interval 414 and time interval 415, therefore, Lx is coupled to GND.

At time 415, the level of ramp 1 becomes less than EA_OUT, but level of ramp 2 remains more than the level of ramp 1; as a result, the buck boost converter is placed back to the second power transfer state. As the level of ramp 1 resets, a new cycle of power state transfers as described above with respect to diagram 410 begins.

Diagram 420 shows the transition between two different power transfer states. As shown in timing diagram 420, during the first $T_{ON}$ time period (time interval 421 from $T_0$ to $T_{s/2}$), EA_OUT is less than the level of ramp 2, but greater than the level of ramp 1; as a result, the buck boost converter is in the second power transfer state.

The gate voltages at transistor 330 (Q7) and transistor 334 (Q9) are driven to 5V so that transistors 330 and 334 shown in FIG. 3 are turned on (operated in saturation) and gate voltages at transistor 332 (Q8) and 336 (Q10) shown in FIG. 3 are kept at 0V so that transistors 332 and 336 are turned off (operated in cutoff). During the first $T_{ON}$ time period shown in diagram 420, therefore, $V_{LX}$ increases and the current $I_L$ decreases.

During the second $T_{ON}$ time period (time interval 422 from $T_{s/2}$ to $T_s$, EA_OUT is less than the level of ramp 1, but greater than the level of ramp 2; as a result, the buck boost converter is in the third power transfer state.

The gate voltages at transistor 332 (Q8) and transistor 336 (Q10) are driven to 5V so that transistors 332 and 336 shown in FIG. 3 are turned on (operated in saturation) and gate voltages at transistor 330 (Q7) and 334 (Q9) shown in FIG. 3 are driven to 0V so that transistors 330 and 334 are turned off (operated in cutoff). During the second $T_{ON}$ time period shown in diagram 420, therefore, $L_x$ is coupled to GND via $C_{FLY}$.

At time 423, ramp 1 resets. The level of ramp 2 becomes more than EA_OUT, but the level of ramp 1 becomes less than EA_OUT; as a result, the buck boost converter is placed back to the second power transfer state. And a new cycle of power state transfers as described above with respect to diagram 420 begins.

Diagram 430 shows another transition between different power transfer states. As shown in timing diagram 430, at the beginning of time interval 431 (also referred to as the first $T_{ON}$ time period in diagram 430), the level of ramp 2 is greater than EA_OUT and EA_OUT is greater than the level of ramp 1; as a result, the buck boost converter is in the second power transfer state.

At time 432, ramp 2 resets. The levels of both ramp 1 and ramp 2 are below EA_OUT; as a result, the buck boost converter is in the fourth power transfer state, in which Lx is coupled to $V_{IN}$.

At the time 433, the level of ramp 1 begins to exceed EA_OUT, which is greater than the level of ramp 2. The buck boost converter is switched to the third power transfer state, in which $L_x$ is coupled to GND via $C_{FLY}$.

After time 433 and during time interval 434 (which includes, the level of ramp 1 beginning to exceed EA_OUT, which is greater than the level of ramp 2. The buck boost converter is in the third power transfer state, in which $L_x$ is coupled to GND via $C_{FLY}$.

At time 435, ramp 1 resets. The levels of both ramp 1 and ramp 2 are below EA_OUT; as a result, the buck boost converter is in the fourth power transfer state until ramp 2 again goes above EA_OUT, and a new cycle of power state transfers as described above with respect to diagram 430 begins, e.g., at the beginning of the time interval 431.

Figure 5:
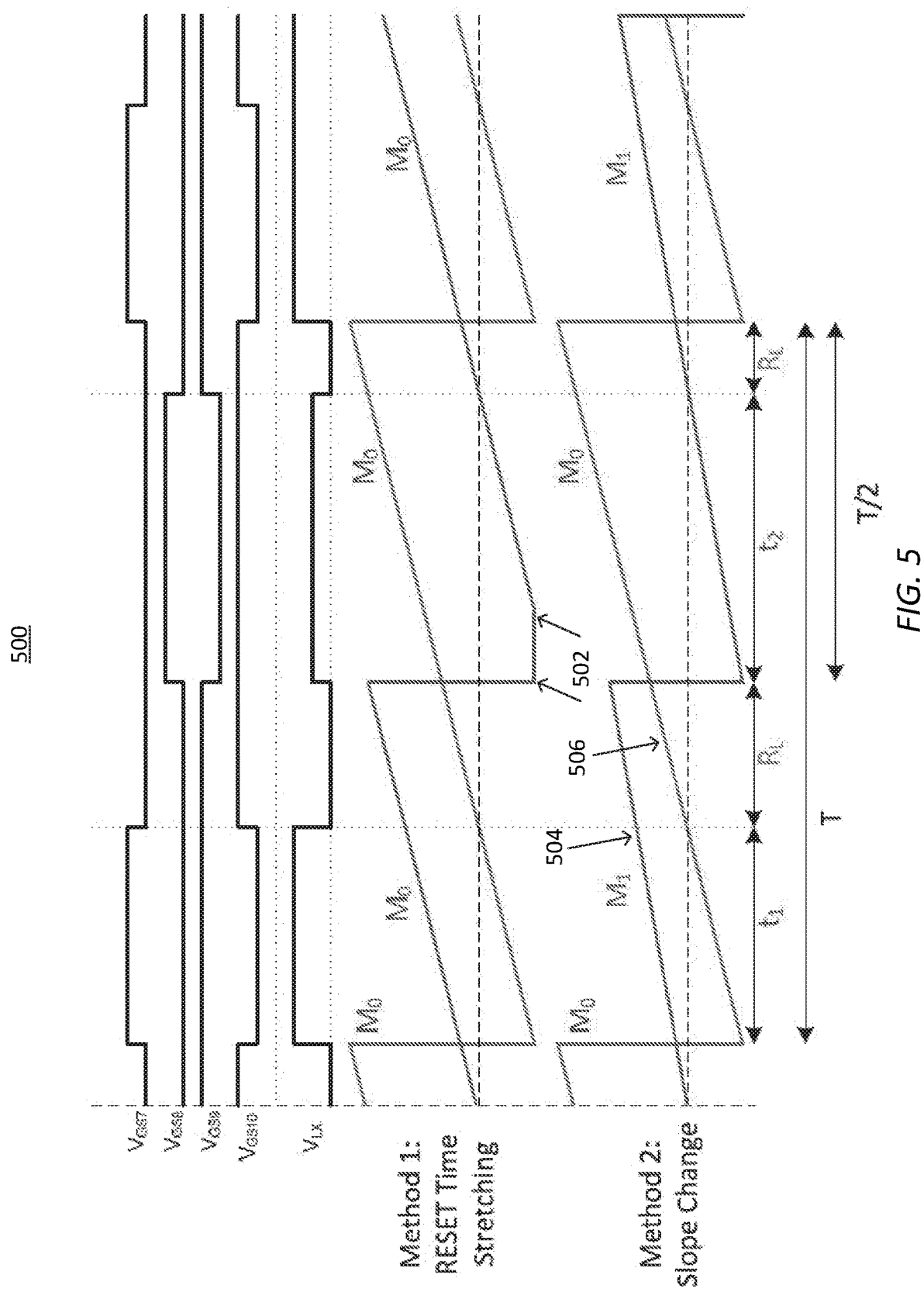
FIG. 5 is a simplified diagram of wave forms demonstrating exemplary operations of a multi-level buck converter control system according to some embodiments.

FIG. 5 is a simplified diagram of wave forms 500 demonstrating exemplary operations of a multi-level buck converter control system according to some embodiments. FIG. 5 demonstrates two example methods for implementing voltage control on $C_{FLY}$: extending a ramp generator's reset time (as shown in Method 1) and changing the slope of signals generated by a ramp generator (as shown in Method 2).

Relating to extending a ramp generator's reset time, as shown in FIG. 5 as Method 1, the reset time period 502 for ramp generator 204 is extended by a predefined amount of time. By modifying the charge time (t1) and the discharge time (t2) such that t2 is greater than t1. The net result is that the average voltage level on the flying capacitor is reduced. In some embodiments, the reset time period for a ramp generator is extended by holding the reset switch in the ramp generator in the reset position for a predefined amount of time using, for example, a one-shot or any other kind of suitable timer. The reset signal may also change (e.g., increase or decrease) its slop. In some example, the slop of the reset signal may be increased to offset the effects of extending the reset time to prevent nonlinearities at higher EA_OUT.

Relating to changing the slope of signals generated by a ramp generator, as shown in FIG. 5, signals generated by different power ramps may have different slopes. As shown in FIG. 5, the slope of the ramp signal 504 (generated by ramp 1) is less steep than the slope of the ramp signal 506. By having different slopes for different ramp signals, a buck boost converter may adjust the ratio between the charge time and the discharge time of the flying capacitor. The net result is that the average voltage level on the flying capacitor can be reduced.

Changing the slope of signals generated by a ramp generator (as shown in Method 2), in some embodiments, is implemented by changing the current source of the power ramp, for example, switching from a weaker current source to a strong current source. For example, ramp generator 202 may be provided a weaker current source, while ramp generator 204 may be provided a stronger current source.

In some embodiments, changing the slope of ramp signals is implemented by changing the size of a capacitor included in the power ramp, for example, switching from a larger-capacitance capacitor included in the power ramp to a smaller-capacitance capacitor included in the power ramp.

Either example method may result in a decreased average voltage on the flying capacitor 312, which in turn can be used to generate one or more of the four above-identified power transfer states.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A circuit comprising:
    a first resettable ramp generator connected to an input voltage and configured to produce a first ramp signal, the first resettable ramp generator including a first current source, a first switch coupled between an output of the first current source and ground, and a first capacitor coupled between the output of the first current source and ground to provide the first ramp signal, the first switch being controlled to ground the output of the first current source according to a first reset signal:
    a second resettable ramp generator connected to the input voltage and configured to produce a second ramp signal, the second resettable ramp generator including a second current source, a second switch coupled between an output of the second current source and ground, and a second capacitor coupled between the output of the second current source and ground to provide the second ramp signal, the second switch being controlled to ground the output of the second current source according to a second reset signal, the second reset signal being shorter than the first reset signal resulting in the first ramp signal being different from the second ramp signal: and
    an error amplifier configured to produce an error amplifier output related to a comparison between an output voltage of the circuit and a reference voltage:
    wherein the first ramp signal and the error amplifier output are compared to produce a first (pulse width modulation) PWM signal and the second ramp signal and the error amplifier output are used to produce a second PWM signal, the first PWM signal and the second PWM signal providing four operating states according to the comparisons between the error amplifier output and the first ramp signal and the second ramp signal:
    wherein the first and second PWM signals control an array of switching devices according to the four operating states, and
    wherein operating of the first switch and the second switch according to the first reset signal and the second reset signal controls characteristics of the first PWM signal and the second PWM signal;
    wherein the first and second PWM signals are configured to produce at least four operating states of the circuit, the four operating states includes a first operating state where the error amplifier output is less than both the first ramp signal and the second ramp signal, a second operating state where the error amplifier output is greater than the first ramp signal and less than the second ramp signal, a third operating state where the error amplifier output, a third operating state where the error amplifier output is greater than the second ramp signal and less than the first ramp signal, and a fourth operating state where the error amplifier output is greater than both the first ramp signal and the second ramp signal.

2. The circuit of claim 1, wherein in the first operating state the switching devices are operated to couple an output terminal of the array of switching devices to a ground (GND) terminal of the circuit.

3. The circuit of claim 1, wherein in the second operating state the array of switching devices is operated to couple an output terminal of the circuit, via a capacitor, to a voltage input of the circuit.

4. The circuit of claim 1, wherein in the third operating state the array of switching devices is operated to couple an output terminal of the circuit, via a capacitor, to a GND terminal of the circuit.

5. The circuit of claim 1, wherein in the fourth operating state the array of switching devices is operated to couple an output terminal of the circuit to a voltage input of the circuit.

6. The circuit of claim 1, wherein the first reset signal is arranged such that the first ramp signal includes an extended ramp reset time.

7. The circuit of claim 1, wherein the first ramp signal and the second ramp signal have different slopes.

8. The circuit of claim 1, wherein the array of switching devices includes a first switching device, a second switching device, a third switching device, and a fourth switching device.

9. The circuit of claim 8, wherein a first lead of the first switching device is connected to an input voltage of the circuit and a second lead of the first switching device is connected to a first lead of a capacitor included in the circuit, wherein a first lead of the second switching device is connected to the first lead of the capacitor included in the circuit and a second lead of the second switching device is connected to a switching (Lx) terminal of the circuit and to a first lead of an inductor included in the circuit, wherein a first lead of the third switching device is connected to the switching (Lx) terminal of the circuit and to the first lead of an inductor included in the circuit and a second lead of the third switching device is connected to a second lead of the capacitor included in the circuit, and wherein a first lead of the fourth switching device is connected to the second lead of the capacitor included in the circuit and a second lead of the fourth switching device is connected to a ground (GND) terminal of the circuit.

10. The circuit of claim 8, wherein the first switching device, the second switching device, the third switching device, and the fourth switching device are MOSFETs.

11. The circuit of claim 8, wherein the first PWM signal is a control signal to the first switching device, and an inversion of the first PWM signal is a control signal to the fourth switching device.

12. The circuit of claim 8, wherein the second PWM signal is a control signal to the second switching device, and an inversion of the second PWM signal is a control signal to the third switching device.

13. A circuit comprising:
    an array of switching devices that includes a first switching device, a second switching device, a third switching device, and a fourth switching device, wherein
    a first lead of the first switching device is connected to an input voltage of the circuit and a second lead of the first switching device is connected to a first lead of a capacitor included in the circuit, a first lead of the second switching device is connected to the first lead of the capacitor included in the circuit and a second lead of the second switching device is connected to a switching (Lx) terminal of the circuit and to a first lead of an inductor included in the circuit, a first lead of the third switching device is connected to the switching (Lx) terminal of the circuit and to the first lead of an inductor included in the circuit and a second lead of the third switching device is connected to a second lead of the capacitor included in the circuit, and a first lead of the fourth switching device is connected to the second lead of the capacitor included in the circuit; and a second lead of the fourth switching device is connected to a ground (GND) terminal of the circuit, the first switching device, the second switching device, the third switching device, and the fourth switching device are controlled by a first PWM signal and a second PWM signal;

an error amplifier configured to produce an error amplifier output related to a comparison between an output voltage of the circuit and a reference voltage;

a first resettable ramp generator that includes a first current source, a first switch coupled between an output of the first current source and ground, and a first capacitor coupled between the output of the first current source and ground to provide a first ramp signal, the first switch being controlled to ground the output of the first current source according to a first reset signal;

a second resettable ramp generator including a second current source, a second switch coupled between an output of the second current source and ground, and a second capacitor coupled between the output of the second current source and ground to provide the second ramp signal, the second switch being controlled to ground the output of the second current source according to a second reset signal, the second reset signal being shorter than the first reset signal, the first ramp signal and the second ramp signal being different;

a first comparator that receives the first ramp signal and the error amplifier output and produces the first PWM signal; and a second comparator that receives the second ramp signal and the error amplifier output and produces the second PWM signal, wherein operating of the first switch of the first resettable ramp generator according to the first reset signal and the second switch of the second resettable ramp generator according to the second reset signal controls characteristics of the first PWM signal and the second PWM signal, and wherein the first and second PWM signals are configured to produce four operating states of the circuit that controls the array of switching devices, the four operating states includes a first operating state where the error amplifier output is less than both the first ramp signal and the second ramp signal, a second operating state where the error amplifier output is greater than the first ramp signal and less than the second ramp signal, a third operating state where the error amplifier output, a third operating state where the error amplifier output is greater than the second ramp signal and less than the first ramp signal, and a fourth operating state where the error amplifier output is greater than both the first ramp signal and the second ramp signal.

14. A method of delivering power comprising: generating a first ramp signal from a first resettable ramp generator, the first resettable ramp generator including a first current source, a first switch coupled between an output of the first current source and ground, and a first capacitor coupled between the output of the first current source and ground to provide the first ramp signal, the first switch being controlled to ground the output of the first current source according to a first reset signal:

generating a second ramp signal from a second resettable ramp generator, the second ramp signal being different from the first ramp signal, the second resettable ramp generator including a second current source, a second switch coupled between an output of the second current source and ground, and a second capacitor coupled between the output of the second current source and ground to provide the second ramp signal, the second switch being controlled to ground the output of the second current source according to a second reset signal, the second reset signal being shorter than the first reset signal resulting in the first ramp signal different from the second ramp signal;

generating an error signal based on a comparison between an output voltage of a power converter and a reference voltage;

generating a first pulse width modulation (PWM) signal based on comparison of the first ramp signal and the error signal;

generating a second PWM signal based on comparison of the second ramp signal and the error signal; and controlling an operating state of the power converter using the first PWM signal and the second PWM signal coupled to an array of switching devices, the operating state being one of four operating states according to the first PWM signal and the second PWM signal;

wherein operating of the first switch and the second switch according to the first reset signal and the second reset signal controls characteristics of the first PWM signal and the second PWM signal;

wherein the first and second PWM signals are configured to produce at least four operating states of the circuit, the four operating states includes a first operating state where the error signal is less than both the first ramp signal and the second ramp signal, a second operating state where the error signal is greater than the first ramp signal and less than the second ramp signal, a third operating state where the error signal, a third operating state where the error signal is greater than the second ramp signal and less than the first ramp signal, and a fourth operating state where the error signal is greater than both the first ramp signal and the second ramp signal.

15. The method of claim 14, wherein generating the first ramp signal includes generating the first ramp signal with an extended ramp reset time.

16. The method of claim 14, wherein generating the first ramp signal includes generating the first ramp signal with a slope that is different than a slope of the second ramp signal.

* * * * *